United States Patent
Yui

(10) Patent No.: US 10,875,400 B2
(45) Date of Patent: Dec. 29, 2020

(54) HYBRID VEHICLE

(71) Applicant: HONDA MOTOR CO., LTD., Tokyo (JP)

(72) Inventor: Naoki Yui, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 142 days.

(21) Appl. No.: 16/129,052

(22) Filed: Sep. 12, 2018

(65) Prior Publication Data
US 2019/0105979 A1 Apr. 11, 2019

(30) Foreign Application Priority Data
Oct. 6, 2017 (JP) .................................. 2017-196340

(51) Int. Cl.
*B60K 6/24* (2007.10)
*B60K 6/442* (2007.10)
(Continued)

(52) U.S. Cl.
CPC ................ *B60K 6/442* (2013.01); *B60K 6/24* (2013.01); *B60K 6/26* (2013.01); *B60K 6/38* (2013.01);
(Continued)

(58) Field of Classification Search
CPC . B60K 6/442; B60K 6/24; B60K 6/26; B60K 6/38; B60Y 2200/92; B60Y 2300/18191
See application file for complete search history.

(56) References Cited

U.S. PATENT DOCUMENTS

2012/0245783 A1* 9/2012 Tamagawa ............. B60K 6/442
701/22
2013/0307329 A1* 11/2013 Ito ......................... B60W 20/00
307/10.1
(Continued)

FOREIGN PATENT DOCUMENTS

| JP | H10-339182 A | 12/1998 |
| JP | 2009-248767 A | 10/2009 |

(Continued)

OTHER PUBLICATIONS

Apr. 2, 2019, Japanese Office Action issued for related JP Application No. 2017-196340.

*Primary Examiner* — Bryan A Evans
(74) *Attorney, Agent, or Firm* — Paratus Law Group, PLLC

(57) ABSTRACT

A hybrid vehicle includes: a first rotating electric machine connected to an output shaft; an internal combustion engine; a second rotating electric machine connected to the internal combustion engine; a deriving portion configured to derive a required driving force based on an opening degree of an accelerator pedal operated by a driver of the hybrid vehicle; and a control portion configured to control the internal combustion engine, the first rotating electric machine, and the second rotating electric machine according to the required driving force. The control portion is configured to hold a revolution of the internal combustion engine at a predetermined value variable based on a travelling speed of the hybrid vehicle when the required driving force is 0 or less during travelling of the hybrid vehicle by power of the first rotating electric machine. The predetermined value is greater as the travelling speed is higher.

9 Claims, 10 Drawing Sheets

(51) Int. Cl.
*B60K 6/38* (2007.10)
*B60K 6/26* (2007.10)

(52) U.S. Cl.
CPC . *B60Y 2200/92* (2013.01); *B60Y 2300/18191* (2013.01)

(56) References Cited

U.S. PATENT DOCUMENTS

| | | | |
|---|---|---|---|
| 2014/0172214 A1 | 6/2014 | Kim | |
| 2015/0046007 A1 | 2/2015 | Wakashiro et al. | |
| 2015/0046010 A1* | 2/2015 | Wakashiro | B60W 10/30 |
| | | | 701/22 |

FOREIGN PATENT DOCUMENTS

| | | |
|---|---|---|
| JP | 2013-241129 A | 12/2013 |
| JP | 2014-184959 A | 10/2014 |

\* cited by examiner

HYBRID VEHICLE

CROSS-REFERENCE TO RELATED APPLICATIONS

The present application claims the benefit of priority of Japanese Patent Application No. 2017-196340, filed on Oct. 6, 2017, the content of which is incorporated herein by reference.

TECHNICAL FIELD

The present invention relates to a hybrid vehicle.

BACKGROUND ART

JP-A-1998-339182 discloses a combined vehicle driving apparatus of an internal combustion engine and an electric motor. In the combined vehicle driving apparatus, a transmission equipped with a lockup clutch is connected to the internal combustion engine and a drive wheel is driven via a reduction gear. Further, a first electric motor which drives the drive wheel is connected to the transmission. In addition, a clutch device is interposed between an auxiliary device driven by the internal combustion engine and a crankshaft of the internal combustion engine and a second electric motor is provided to be able to drive the auxiliary device. In the combined vehicle driving apparatus with such a configuration, when a vehicle decelerates with the fuel supply to the internal combustion engine stopped, the second electric motor performs motoring of the internal combustion engine via the clutch device, in such a manner that excessive reduction in a revolution of the internal combustion engine and further stopping of the internal combustion engine are avoided.

In the combined vehicle driving apparatus disclosed in JP-A-1998-339182 described above, when the second electric motor shifts to a motoring deceleration mode in which motoring of the internal combustion engine is performed, the revolution of the internal combustion engine is controlled to converge to a target engine speed. Therefore, when the accelerator pedal is depressed in this mode, a self-sustaining operation of the internal combustion engine is started immediately by the resumption of fuel injection and the operation can be shifted to acceleration. However, an output required for sufficient acceleration depends on the vehicle speed or the like when the accelerator pedal is depressed. However, in the combined vehicle driving apparatus described in JP-A-1998-339182, the target engine speed is set regardless of the change in the vehicle speed, and thus it is not possible to achieve sufficient acceleration responsiveness depending on the vehicle speed when the accelerator pedal is depressed.

SUMMARY

An object of the invention is to provide a hybrid vehicle capable of realizing improvement of acceleration responsiveness not depending on a travelling speed when a required driving force increases during deceleration travelling.

According to a first aspect of the invention, there is provided a hybrid vehicle including: a first rotating electric machine connected to an output shaft; an internal combustion engine; a second rotating electric machine connected to the internal combustion engine; a deriving portion configured to derive a required driving force based on an opening degree of an accelerator pedal operated by a driver of the hybrid vehicle; and a control portion configured to control the internal combustion engine, the first rotating electric machine, and the second rotating electric machine according to the required driving force, the control portion being configured to hold a revolution of the internal combustion engine at a predetermined value variable based on a travelling speed of the hybrid vehicle when the required driving force is 0 or less during travelling of the hybrid vehicle by power of the first rotating electric machine, and the predetermined value being greater as the travelling speed is higher.

According to a second aspect of the invention, in the hybrid vehicle of the first aspect, the control portion may hold the revolution of the internal combustion engine at the predetermined value when the required driving force is 0 or less during travelling of the hybrid vehicle by power of the first rotating electric machine to which electric power generated by the second rotating electric machine with power of the internal combustion engine is supplied.

According to a third aspect of the invention, the hybrid vehicle of the first or second aspect may further includes a connection/disconnection portion configured to connect or disconnect a transmission path of power between the internal combustion engine and the output shaft, and the predetermined value may be equal to or less than the revolution of the internal combustion engine when the hybrid vehicle travels in a state where the connection/disconnection portion is engaged.

According to a fourth aspect of the invention, in the hybrid vehicle of the any one of the first to third aspects, the predetermined value may be higher than the revolution of the internal combustion engine of an idling operation.

According to a fifth aspect of the invention, in the hybrid vehicle of the any one of the first to fourth aspects, when the revolution of the internal combustion engine is controlled to be held at the predetermined value, the control portion may control so that the second rotating electric machine to generate electric power with power of the internal combustion engine.

According to a sixth aspect of the invention, the hybrid vehicle of the fifth aspect may further includes an energy storage device configured to be electrically connected to the first rotating electric machine and the second rotating electric machine, and the control portion may control electric power generated by the second rotating electric machine with power of the internal combustion engine to be input to the energy storage device, and control the second rotating electric machine to generate electric power within a range not exceeding a limit value of the electric power input to the energy storage device.

According to a seventh aspect of the invention, in the hybrid vehicle of the sixth aspect, when the electric power input to the energy storage device exceeds the limit value in a state where the revolution of the internal combustion engine is controlled to be held at the predetermined value, the control portion may lower torque of the internal combustion engine while the revolution is held at the predetermined value.

According to an eighth aspect of the invention, in the hybrid vehicle of the any one of the first to seventh aspects, the predetermined value, when the hybrid vehicle travels on a slope in a state where the revolution of the internal combustion engine is controlled to be the predetermined value, may be a value variable corresponding to a gradient of the slope.

According to a ninth aspect of the invention, in the hybrid vehicle of the eighth aspect, when the slope is an uphill road, the predetermined value may be greater as the gradient of the uphill road is larger.

EFFECTS

In the hybrid vehicle according to the first aspect, when the required driving force during travelling by the power of the first rotating electric machine is large, electric power generated by the second rotating electric machine with the power of the internal combustion engine is supplied to the first rotating electric machine. However, the magnitude of the generated electric power of the second rotating electric machine depends on the revolution of the internal combustion engine and, when the torque of the internal combustion engine is constant, the higher the revolution of the internal combustion engine is, the greater the generated power is. Therefore, during travelling with the power of the first rotating electric machine, when the required driving force increases, if the revolution of the internal combustion engine is low, the first rotating electric machine cannot obtain sufficient electric power. In addition, the driving force required for travelling of the hybrid vehicle depends on the total of normal driving resistance including rolling resistance, air resistance and the like, accelerating resistance, and gradient resistance. In particular, since the normal driving resistance increases with an increase in the travelling speed of the hybrid vehicle, a greater driving force is required as the travelling speed becomes higher. In this way, when the travelling speed of the hybrid vehicle varies, the running resistance and the like also vary, so that the magnitude of the required output of the first rotating electric machine differs depending on the travelling speed even with the same required driving force.

According to the first aspect, when the hybrid vehicle is travelled by the power of the first rotating electric machine, if the required driving force is 0 or less, control is performed to hold the revolution of the internal combustion engine at a predetermined value in preparation for the subsequent acceleration request. Further, the predetermined value is greater as the travelling speed of the hybrid vehicle is higher. Therefore, according to the first aspect, during travelling of the hybrid vehicle by the power of the first rotating electric machine, even when the required driving force increases in a state where the required driving force is 0 or less and the travelling speed is high, the internal combustion engine can reach a desired revolution in a short time from the high revolution state. That is, it is possible to shorten the response time up to the generation of the high output when the required driving force increases for acceleration, regardless of the travelling speed. In this way, when the required driving force increases during deceleration travelling, it is possible to improve the acceleration responsiveness not depending on the travelling speed of the hybrid vehicle.

According to the second aspect, since, during travelling of the hybrid vehicle by the power of the first rotating electric machine to which the electric power generated by the second rotating electric machine with the power of the internal combustion engine is supplied, the revolution of the internal combustion engine when the required driving force is 0 or less is held at the predetermined value described above, improvement in acceleration responsiveness not depending on the travelling speed of the hybrid vehicle can be realized when the required driving force increases during deceleration travelling in the series travelling.

According to the third aspect, since the predetermined value is lower than the revolution of the internal combustion engine according to the travelling speed in a direct-connection travelling state where the travelling is performed by the power of the internal combustion engine in a state where the connection/disconnection portion is engaged, the revolution of the internal combustion engine decreases when the accelerator pedal is released in the direct-connection travelling state and the required driving force becomes substantially 0. Therefore, the change in the revolution of the internal combustion engine, which occurs when the operation of releasing the accelerator pedal during travelling in the direct-connection travelling state is performed, does not give a driver of the hybrid vehicle any discomfort.

According to the fourth aspect, since the predetermined value is higher than the revolution of the idling operation of the internal combustion engine, it is possible to improve the acceleration responsiveness when the required driving force increases after the required driving force becomes substantially 0.

According to the fifth aspect, when, in order to improve the acceleration responsiveness of the hybrid vehicle, the revolution of the internal combustion engine when the required driving force becomes substantially 0 is controlled to be held at a predetermined value, the second rotating electric machine is controlled to generate electricity by the power of the internal combustion engine. Therefore, while the revolution of the internal combustion engine is held at the predetermined value, it is possible to improve the acceleration responsiveness when the required driving force increases while deterioration in the fuel consumption performance is prevented by power generation.

According to the sixth aspect, since, when the revolution of the internal combustion engine is controlled to be held at a predetermined value, the second rotating electric machine is controlled to generate electricity within a range not exceeding a limit value of the electric power input to the energy storage device, it is possible to protect the energy storage device, prevent deterioration in the fuel consumption performance by storing generated electric power, and improve the acceleration responsiveness when the required driving force increases.

According to the seventh aspect, when the electric power input to the energy storage device exceeds the limit value, the electric power input to the energy storage device can be suppressed within the range not exceeding the limit value by reducing the torque of the internal combustion engine as well as holding the revolution of the internal combustion engine at a predetermined value. Thus, it is possible to realize the improvement of the acceleration responsiveness and protect the energy storage device.

When the hybrid vehicle travels on a slope, the greater the gradient of the slope is, the greater the required driving force is required. According to the eighth aspect, the predetermined value is a value variable corresponding to the gradient of the slope, and thus, even when the required driving force is increased during travelling on a slope in a state where the required driving force is substantially 0, it is possible to improve the acceleration responsiveness of the hybrid vehicle.

According to the ninth aspect, the predetermined value is greater as the gradient of an uphill road on which a hybrid vehicle travels is larger. Thus, even when the required driving force is increased during travelling on a large gradient uphill road in a state where the required driving force is substantially 0, the internal combustion engine can reach the desired revolution in a short time. Therefore, it is possible to improve the acceleration responsiveness when the required driving force increases without depending on the gradient of the uphill road on which a vehicle travels.

DETAILED DESCRIPTION OF EMBODIMENT

Hereinafter, an embodiment of the invention will be described with reference to the drawings.

A Hybrid Electrical Vehicle (HEV) includes a rotating electric machine and an internal combustion engine and travels with a driving force of the rotating electric machine and/or the internal combustion engine according to a travelling state of a vehicle. There are two main types of HEV, series and parallel. A series-type HEV travels with power of a rotating electric machine. The internal combustion engine is mainly used for electric power generation and electric power generated by another rotating electric machine with power of the internal combustion engine charges an energy storage device or is supplied to the rotating electric machine. On the other hand, a parallel type HEV travels with driving force of one or both of the rotating electric machine and the internal combustion engine. Also, an HEV capable of switching between both types has been known. In this type of HEV, a clutch is disengaged or engaged (disconnected or connected) according to a travelling state, so that a transmission system of the driving force is switched to either the series type or the parallel type.

Figure 1:
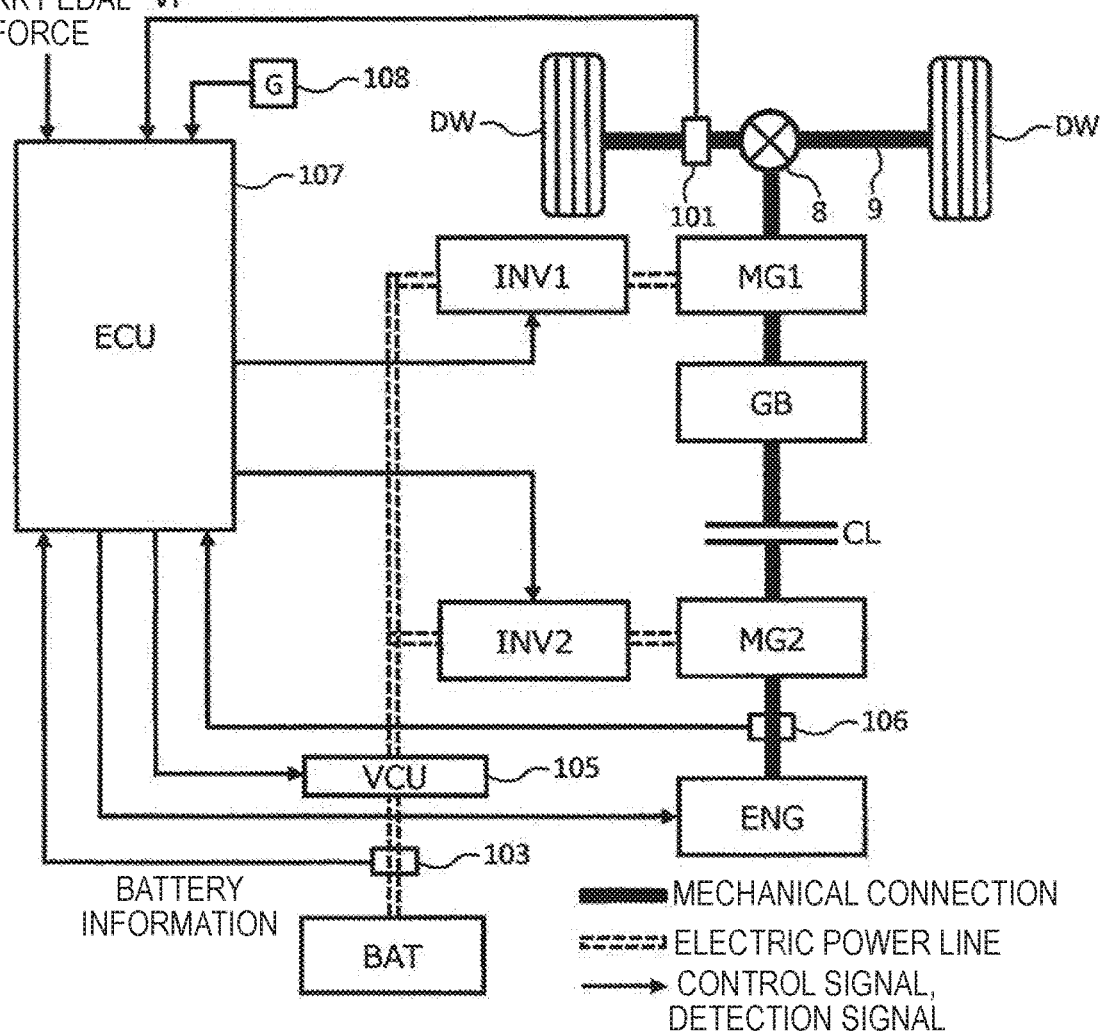
FIG. 1 is a block diagram illustrating an internal configuration of an HEV capable of switching between a series type and a parallel type.

FIG. 1 is a block diagram illustrating an internal configuration of an HEV capable of switching between a series type and a parallel type. The HEV (hereinafter simply referred to as a "vehicle") illustrated in FIG. 1 includes an internal combustion engine ENG for outputting rotating power, a first rotating electric machine MG1, a second rotating electric machine MG2, a lockup clutch (hereinafter simply referred to as a "clutch") CL, a gear box (hereinafter simply referred to as a "gear") GB, a vehicle speed sensor 101, a battery sensor 103, an energy storage device BAT, a Voltage Control Unit (VCU) 105, a first inverter INV1, a second inverter INV2, a revolution sensor 106, an acceleration sensor 108, and an Electronic Control Unit (ECU) 107. In FIG. 1, a thick solid line indicates a mechanical connection and a double-broken line indicates an electric power line, and further, a thin solid line arrow indicates a control signal or a detection signal.

The internal combustion engine ENG drives the second rotating electrical machine MG2 as a generator with the clutch CL disengaged. However, when the clutch CL is engaged, the power output by the internal combustion engine ENG is transmitted to drive wheels DW and DW via the second rotating electrical machine MG2, the clutch CL, the gear GB, the first rotating electric machine MG1, a differential gear 8, and a drive shaft 9 as mechanical energy by which a vehicle travels.

The second rotating electric machine MG2 is driven by the power of the internal combustion engine ENG and generates electric power.

In the first rotating electric machine MG1, a rotor operates as an electric motor by electric power supply from at least one of the energy storage device BAT and the second rotating electric machine MG2 and generates power by which a vehicle travels. The torque generated by the first rotating electric machine MG1 is transmitted to the drive wheels DW and DW via the differential gear 8 and the drive shaft 9. Also, the first rotating electrical machine MG1 can operate as a generator during braking of a vehicle.

In accordance with an instruction from the ECU 107, the clutch CL is disengaged or engaged (disconnected or connected) to make a transmission path of the power from the internal combustion engine ENG to the drive wheels DW and DW cut or uncut. When the clutch CL is in a disengaged state, the power output by the internal combustion engine ENG is not transmitted to the drive wheels DW and DW and, when the clutch CL is in a connected state, the power output by internal combustion engine ENG is transmitted to the drive wheels DW and DW. The gear GB includes a gear shift stage or a fixed gear stage, shifts the power from the internal combustion engine ENG at a predetermined gear ratio, and transmits the power to the drive wheel DW. The gear ratio of the gear GB is changed according to an instruction from the ECU 107.

The energy storage device BAT has a plurality of electricity storage cells connected in series and supplies a high voltage of 100 V to 200 V, for example. The storage cell is, for example, a lithium ion battery or a nickel hydrogen battery.

The vehicle speed sensor 101 detects a travelling speed (vehicle speed VP) of a vehicle. A signal indicating the vehicle speed VP detected by the vehicle speed sensor 101 is sent to the ECU 107.

The battery sensor 103 detects the output (terminal voltage, charging/discharging current) of the energy storage device BAT. Signals indicating the terminal voltage, the charging/discharging current, and the like which are detected by the battery sensor 103 are sent to the ECU 107 as battery information.

The VCU 105 boosts the output voltage of the energy storage device BAT when the first rotating electric machine MG1 operates as a motor. Further, the VCU 105 steps down the output voltage of the first rotating electric machine MG1 when the energy storage device BAT is charged with regenerative electric power which is generated by the first rotating electric machine MG1 during braking of a vehicle and converted into direct current. In addition, the VCU 105 steps down the electric power which is generated by the second rotating electric machine MG2 by the driving of the internal combustion engine ENG and converted into direct current. The power stepped down by the VCU 105 is charged to the energy storage device BAT.

Figure 2:
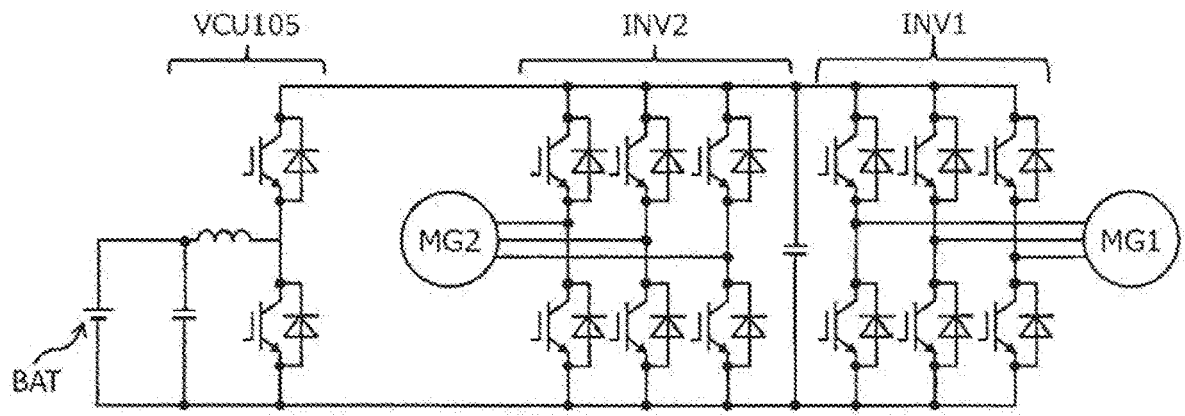
FIG. 2 is an electric circuit diagram illustrating a relationship between an energy storage device, a VCU, a first inverter, a second inverter, a first rotating electric machine, and a second rotating electric machine.

FIG. 2 is an electric circuit diagram illustrating a relationship between the energy storage device BAT, the VCU 105, the first inverter INV1, the second inverter INV2, the second rotating electric machine MG2, and the first rotating electric machine MG1. As illustrated in FIG. 2, the VCU 105 boosts an output-side V2 voltage to a voltage higher than a V1 voltage by switching on and off two switching elements using the V1 voltage output from the energy storage device BAT as an input voltage. The V2 voltage when the two switching elements of the VCU 105 do not perform the on/off switching operation is equal to the voltage V1.

The first inverter INV1 converts the DC voltage into an AC voltage and supplies a three-phase current to the first rotating electric machine MG1. In addition, the first inverter INV1 converts the AC voltage generated by the first rotating electric machine MG1 during the braking of a vehicle into a DC voltage. The second inverter INV2 converts the AC voltage generated by the second rotating electric machine MG2 by the driving of the internal combustion engine ENG into a DC voltage.

The revolution sensor 106 detects a revolution Ne of the internal combustion engine ENG. A signal indicating the revolution Ne detected by the revolution sensor 106 is sent to the ECU 107.

The acceleration sensor 108 detects the acceleration (hereinafter referred to as "front-rear acceleration") acting in a front-rear direction of a vehicle. A signal indicating the front-rear acceleration detected by the acceleration sensor 108 is sent to the ECU 107. The value of the front-rear acceleration indicates a positive value when acceleration is applied in a front direction of a vehicle and a negative value when acceleration is applied in a rearward direction of a vehicle. Therefore, the value of the front-rear acceleration detected on an uphill road is larger toward the positive value side as the gradient of the uphill road is larger.

The ECU 107 performs control suitable for the state of a vehicle by controlling the first inverter INV1, the second inverter INV2, and the VCU 105 and controlling the disconnection and connection of the clutch CL and the operation of the internal combustion engine ENG according to the state of the vehicle. A signal indicating an opening degree (AP opening degree) of an accelerator pedal operated by a driver of a vehicle, a signal indicating a brake pedal force (BRK pedal force) corresponding to the operation of a brake pedal by a driver, a signal indicating the vehicle speed VP obtained from the vehicle speed sensor 101, a signal indicating the battery information obtained from the battery sensor 103, a signal indicating the revolution Ne of the internal combustion engine ENG detected by the revolution sensor 106, and a signal indicating the front-rear acceleration detected by the acceleration sensor 108 are input to the ECU 107.

Figure 3:
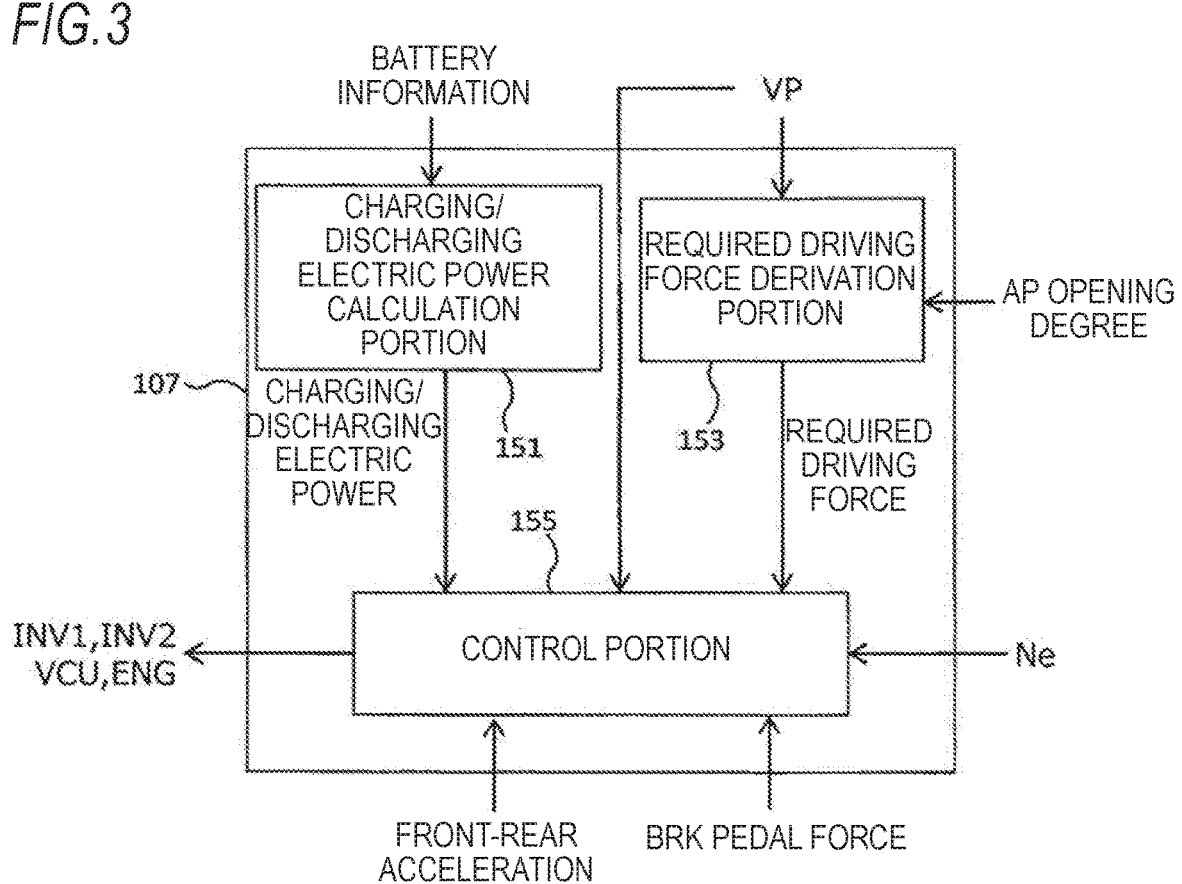
FIG. 3 is a block diagram illustrating an internal configuration of an ECU which performs control suitable for a state of a vehicle.

FIG. 3 is a block diagram illustrating an internal configuration of the ECU 107 which performs control suitable for the state of a vehicle. As illustrated in FIG. 3, the ECU 107 has a charging/discharging electric power calculation portion 151, a required driving force derivation portion 153, and a control portion 155. Each constituent element of the ECU 107 will be described below.

Based on the battery information obtained from the battery sensor 103, the charging/discharging electric power calculation portion 151 calculates the charging electric power input to the energy storage device BAT or the discharging electric power output by the energy storage device BAT.

Figure 4:
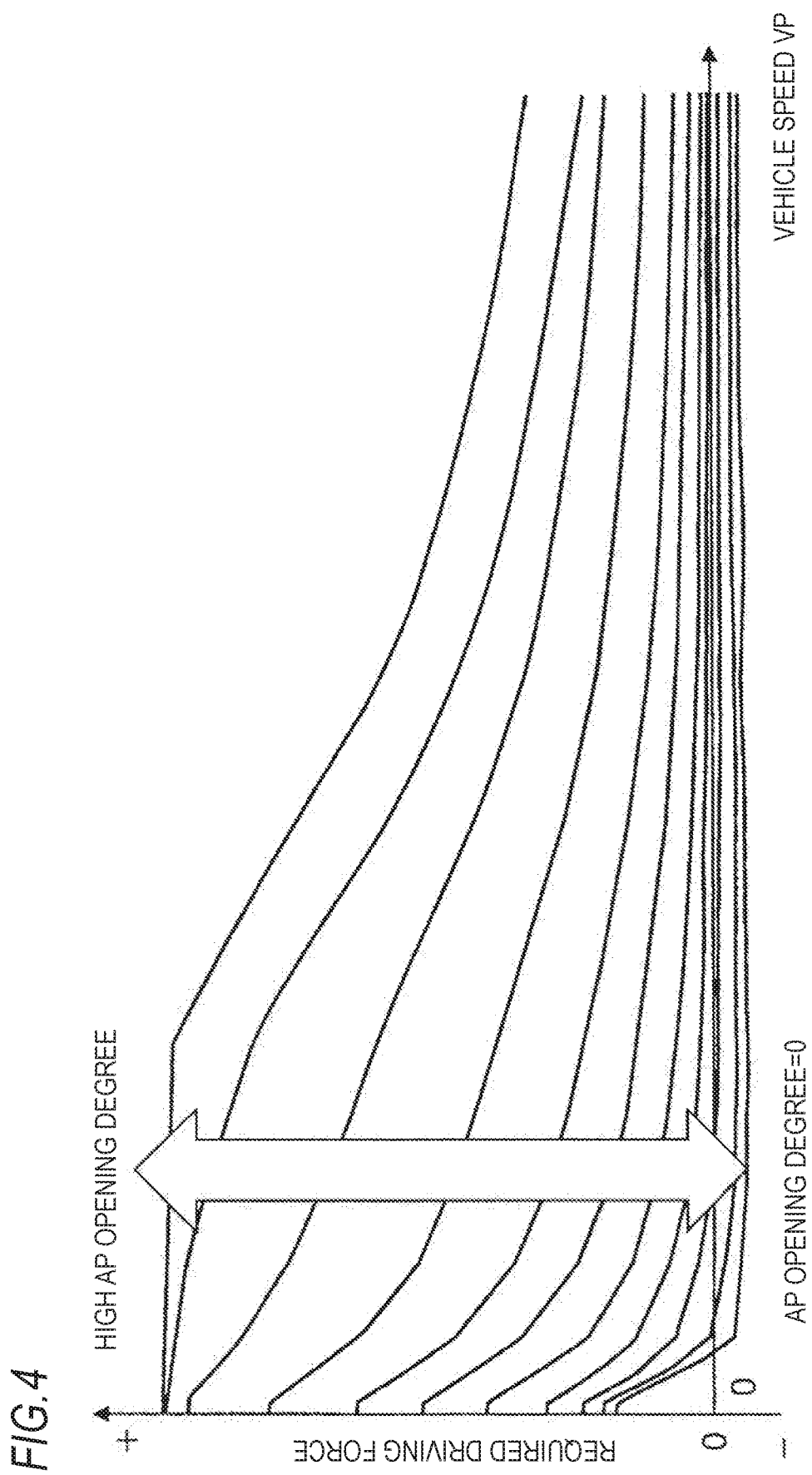
FIG. 4 is a diagram illustrating a relationship between an accelerator pedal opening degree, a vehicle speed, and a required driving force.

The required driving force derivation portion 153 derives the required driving force to a vehicle based on the AP opening degree and the vehicle speed VP obtained from the vehicle speed sensor 101. FIG. 4 is a diagram illustrating a relationship between the AP opening degree, the vehicle speed VP, and the required driving force. Based on the AP opening degree and the vehicle speed VP, the required driving force derivation portion 153 derives the required driving force from a calculation expression or a map of the relation illustrated in FIG. 3. In the required driving force derived by the required driving force derivation portion 153, when a vehicle speed is in a middle vehicle speed region or a high vehicle speed region, the required driving force becomes equal to or less than 0 as the AP opening degree becomes closer to 0.

The control portion 155 selects in which travelling mode described below a vehicle travels based on the required driving force derived by the required driving force derivation portion 153 and the like and controls the first inverter INV1, the second inverter INV2, the VCU 105, the internal combustion engine ENG, and the clutch CL according to the selected travelling mode, the required driving force, and the like.

Figure 5:
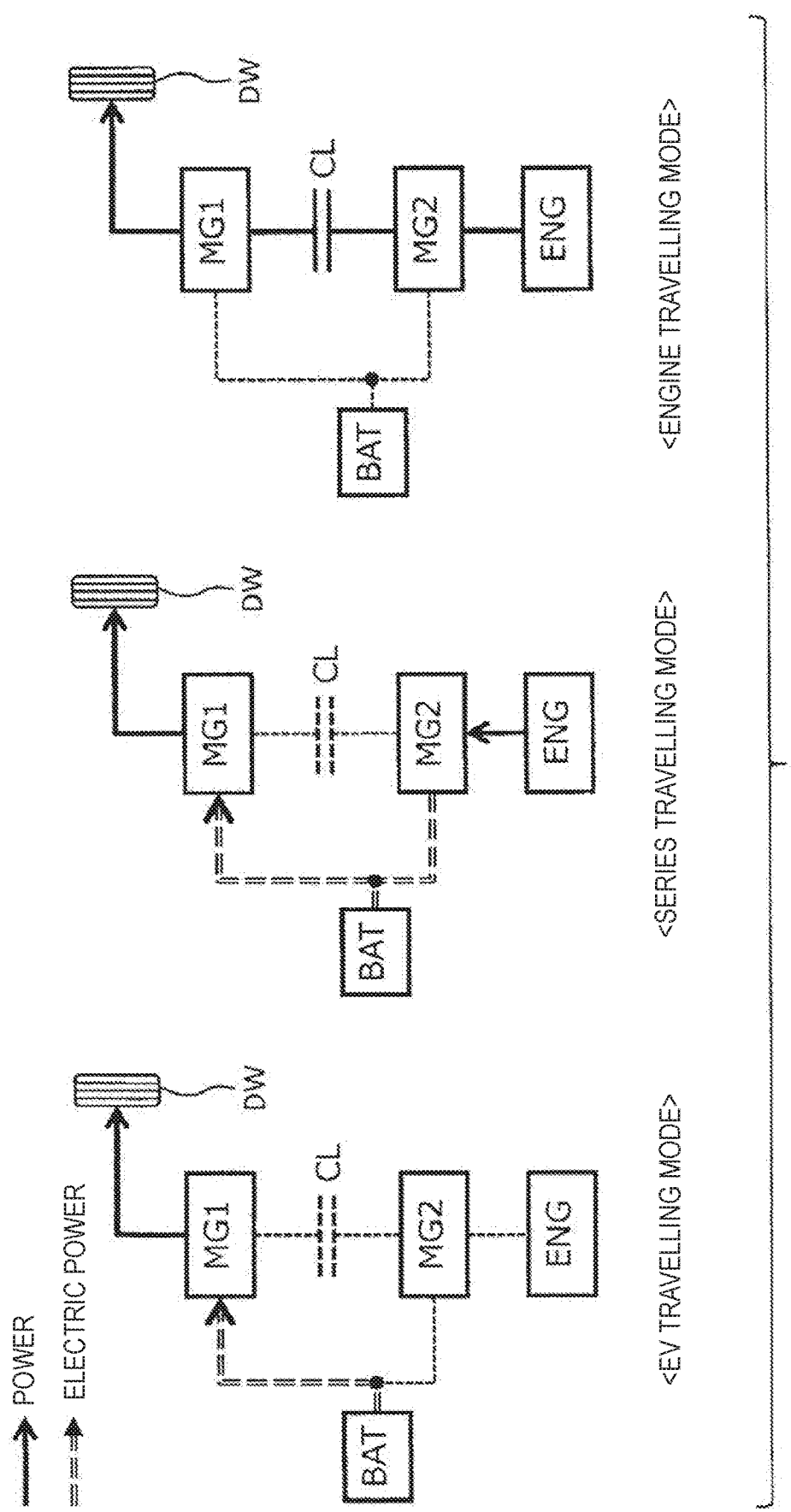
FIG. 5 is a diagram illustrating transmission of power and electric power in a vehicle set to each travelling mode.

As illustrated in FIG. 5, the vehicle illustrated in FIG. 1 typically has the following travelling modes.

In a vehicle set to an EV travelling mode, the clutch CL is released and the internal combustion engine ENG is stopped. The vehicle travels with the power of the first rotating electric machine MG1 which is driven by power supply from the energy storage device BAT.

In a vehicle set to a series travelling mode, the clutch CL is released and the internal combustion engine ENG is operated. The vehicle travels with the power of the first rotating electric machine MG1 to which the electric power generated by the second rotating electric machine MG2 by the operation of the internal combustion engine ENG is supplied, together with the electric power supply from the energy storage device BAT.

In a vehicle set to an engine travelling mode, the clutch CL is engaged and the internal combustion engine ENG is driven. The vehicle travels with the power output by the internal combustion engine ENG. When a vehicle travels in the engine travelling mode, respective rotors of the first rotating electric machine MG1 and the second rotating electric machine MG2 are rotated together with the driving of the internal combustion engine ENG. However, the ECU 107 performs zero torque control so that the first rotating electrical machine MG1 and the second rotating electric machine MG2 are in a no-load state.

Figure 6:
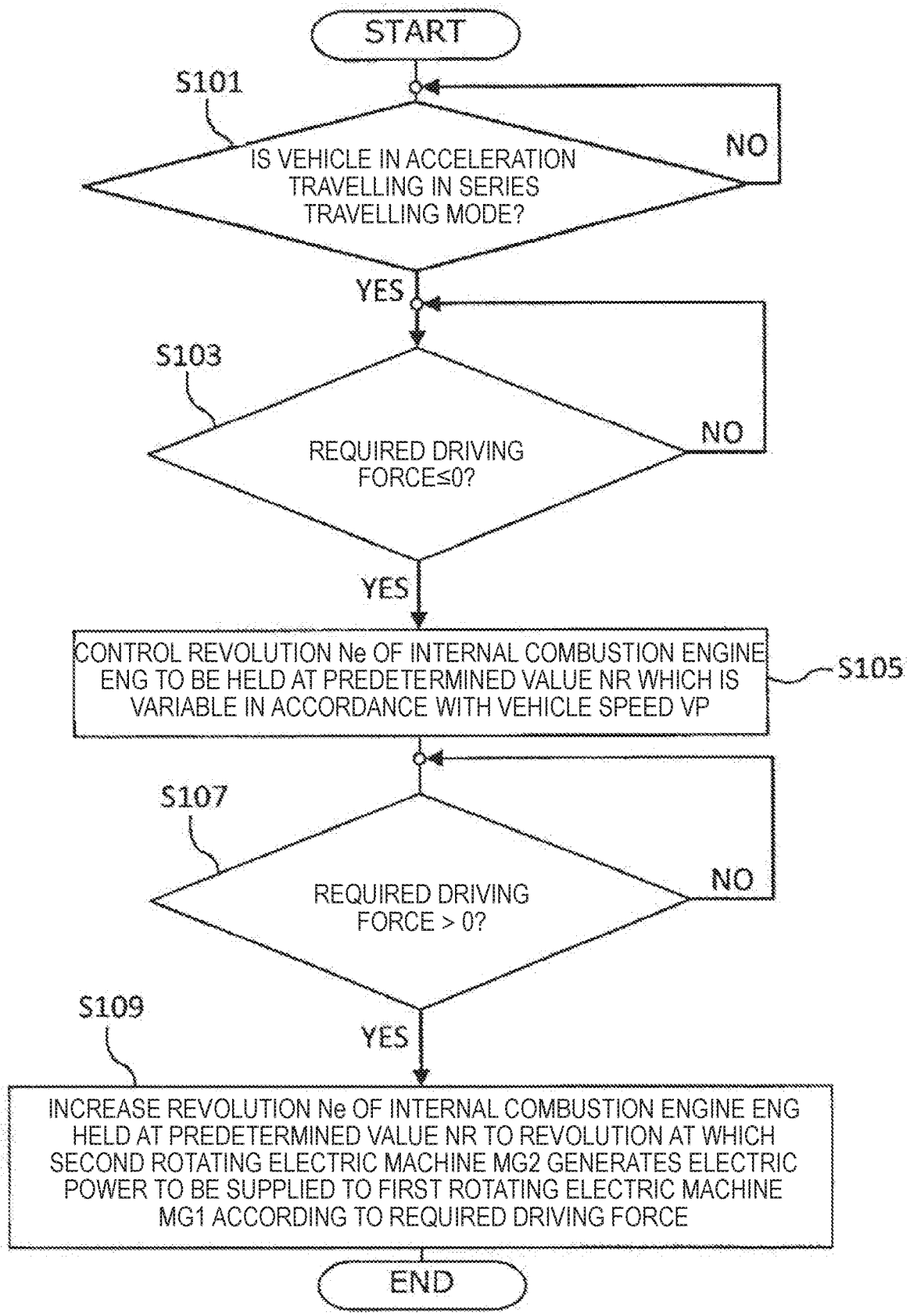
FIG. 6 is a flowchart illustrating processes performed by the ECU when a vehicle shifts to acceleration travelling again after the vehicle shifts from acceleration travelling to natural deceleration travelling during travelling in a series travelling mode.
Figure 7:
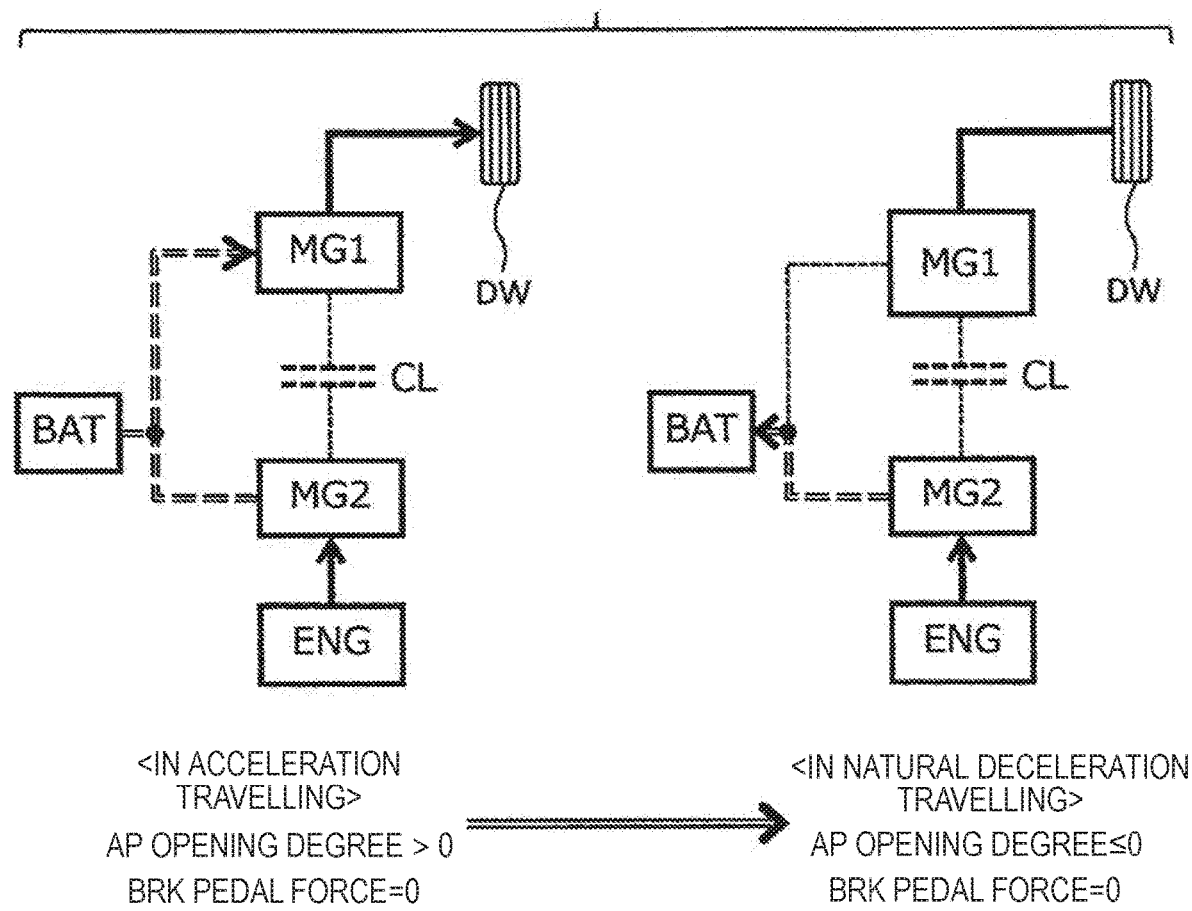
FIGS. 7A and 7B are diagrams illustrating transmission of power and electric power during acceleration travelling in the series travelling mode and natural deceleration travelling in the series travelling mode.

Hereinafter, processes performed by the ECU 107 when the required driving force becomes 0 or less during acceleration travelling in the series travelling mode and the travelling is shifted to natural deceleration travelling will be described in detail with reference to FIGS. 6, 7A, and 7B. FIG. 6 is a flowchart illustrating processes performed by the ECU 107 in a case where natural deceleration travelling is shifted to acceleration travelling after acceleration travelling is shifted to natural deceleration travelling while a vehicle is travelling in a series travelling mode. FIGS. 7A and 7B are diagrams illustrating transmission of power and electric power during acceleration travelling in the series travelling mode and natural deceleration travelling in the series travelling mode. "Acceleration travelling" means a state in which a vehicle travels in a state where the required driving force is greater than 0 as a driver depresses the accelerator pedal. Further, it is not necessary for the vehicle speed VP to increase during acceleration travelling. Further, "natural deceleration travelling" means a state where the required driving force becomes 0 or less because the accelerator pedal stepped on by a driver has been released and the vehicle decelerates due to travelling resistance or the like because the operation of stepping on the brake pedal has not been performed. During natural deceleration travelling, a regenerative operation of the first rotating electric machine MG1 may be performed.

As illustrated in FIG. 6, the control portion 155 of the ECU 107 determines whether the vehicle is in acceleration travelling in the series travelling mode from the required driving force derived by the required driving force derivation portion 153 (Step S101) and, when the vehicle is in acceleration travelling in the series travelling mode, the process proceeds to Step S103. As illustrated in FIG. 7A, in the vehicle in acceleration travelling in the series travelling mode, the internal combustion engine ENG operated according to the required driving force drives the second rotating electric machine MG2 as a generator and the vehicle travels by the power of first rotating electric machine MG1 to which the electric power generated by the second rotating electric machine MG2 is supplied.

In Step S103, when the required driving force is changed from a positive value to 0 or less and the BRK pedal force remains 0, the control portion 155 determines that travelling is shifted to natural deceleration travelling and the process proceeds to Step S105. In a vehicle in natural deceleration travelling in the series travelling mode, the operation of the internal combustion engine ENG may be stopped because the required driving force is equal to or less than 0. However, in the embodiment, in preparation for the subsequent acceleration request, the control portion 155 controls the revolution Ne of the internal combustion engine ENG to be held at a predetermined value NR which is variable in accordance with the vehicle speed VP (Step S105). Therefore, as illustrated in FIG. 7B, in the vehicle in natural deceleration travelling in the series travelling mode, the operation of the internal combustion engine ENG is maintained while the revolution Ne is held at the predetermined value NR.

The predetermined value NR which is the revolution Ne of the internal combustion engine ENG held in Step S105 is a value variable according to the vehicle speed VP in natural deceleration travelling and is set to a greater value as the vehicle speed VP is greater. Further, the predetermined value NR is a value greater than the revolution (idle revolution) of an idling operation of the internal combustion engine ENG. Further, the predetermined value NR is a value lower than the revolution Ne of the internal combustion engine ENG according to the vehicle speed VP when the vehicle travels in the engine travelling mode.

When, in an uphill road, the vehicle is in natural deceleration travelling in the series travelling mode while the required driving force is maintained at 0 or less, the predetermined value NR is changed according to the gradient of the uphill road and set to a greater value as the gradient is larger. That is, the control portion 155 calculates the gradient of the uphill road based on the front-rear acceleration obtained from the acceleration sensor 108 and the vehicle speed and adjusts the predetermined value NR which is variable according to the vehicle speed in accordance with the calculated gradient.

In the process of Step S105, the control portion 155 performs control so that the second rotating electric machine MG2 generates electricity by the output of the internal combustion engine ENG which is operated at the revolution Ne held at the predetermined value NR. In this case, the generated electric power of the second rotating electric machine MG2 is input to the energy storage device BAT and the energy storage device BAT is charged. However, the maximum limit value for the purpose of suppression of deterioration of the energy storage device BAT, prevention of failure, or the like is set for the charging electric power input to the energy storage device BAT. Therefore, the control portion 155 controls the driving point of the internal combustion engine ENG such that the second rotating electrical machine MG2 generates electricity within a range where the charging electric power calculated by the charging/discharging electric power calculating portion 151 of the ECU 107 does not exceed the maximum limit value. For example, when the charging electric power exceeds the maximum limit value, the control portion 155 controls to reduce the torque of the internal combustion engine ENG while the revolution Ne of the internal combustion engine ENG is held at the predetermined value NR.

When the required driving force becomes larger than 0 and the BRK pedal force remains 0 during the natural deceleration in the series travelling mode in which the process of Step S105 described above is performed (YES in Step S107), the control portion 155 determines that travelling is shifted to acceleration travelling and the process proceeds to Step S109. In this case, the control portion 155 performs control such that the revolution Ne of the internal combustion engine ENG held at the predetermined value NR is increased to a revolution at which the second rotating electric machine MG2 generates electric power to be supplied to the first rotating electrical machine MG1 according to the required driving force (Step S109).

Figure 8:
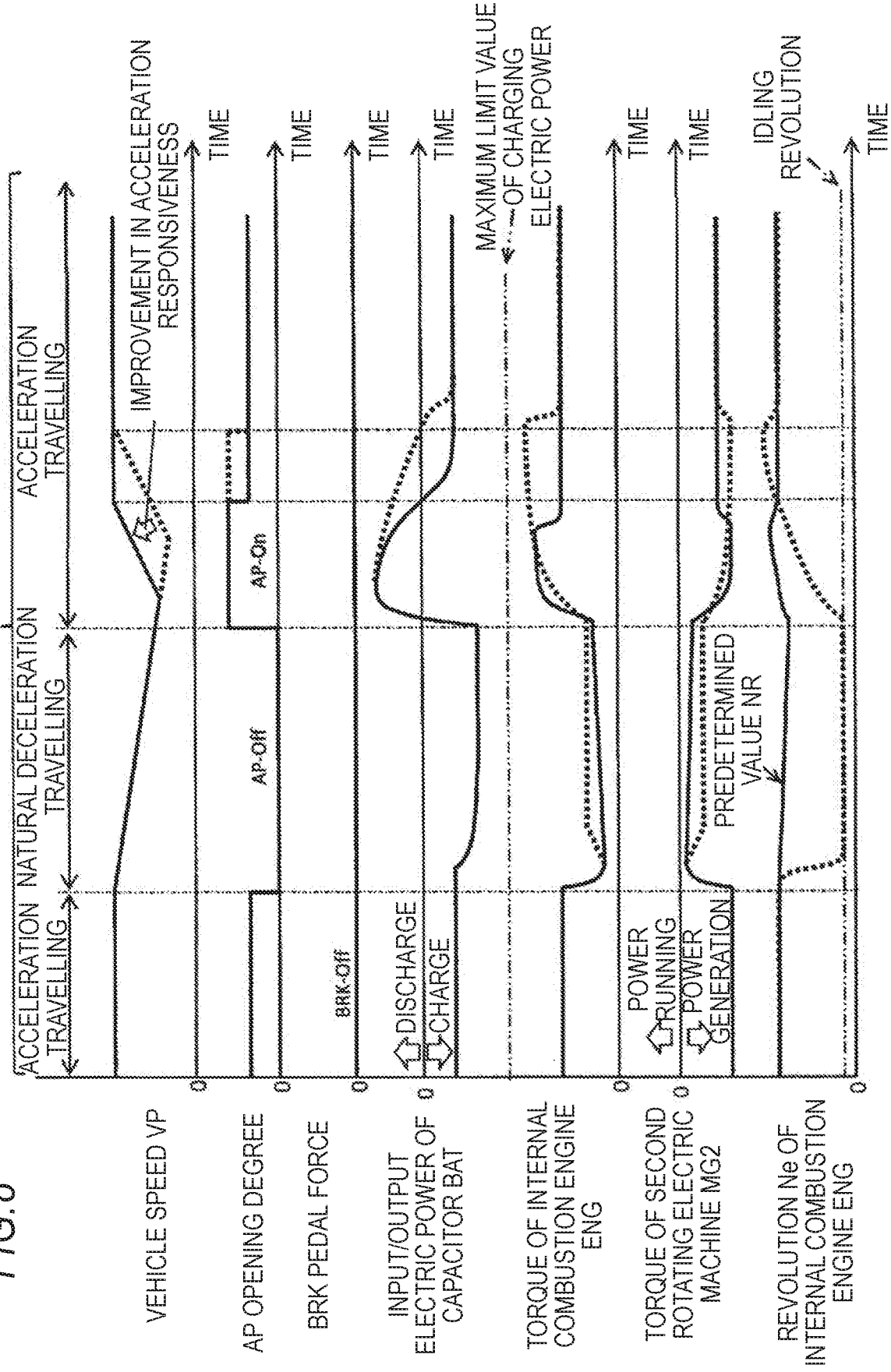
FIG. 8 is a view illustrating an example of changes over time of each parameter when a vehicle shifts to acceleration travelling again after the vehicle shifts from acceleration travelling to natural deceleration travelling during travelling in the series travelling mode.

FIG. 8 is a view illustrating an example of changes with time of each parameter when a vehicle shifts to acceleration travelling again after the vehicle shifts from acceleration travelling to natural deceleration travelling while the vehicle travels in the series travelling mode. In FIG. 8, the change in a case of the embodiment in which the revolution Ne of the internal combustion engine ENG is held at the predetermined value NR described above when acceleration travelling is shifted to natural deceleration travelling in the series travelling mode is indicated by a solid line and the change in a case where the revolution Ne of the internal combustion engine ENG is reduced to the idle revolution is indicated by a dotted line.

In an example illustrated in FIG. 8, when the AP opening degree becomes 0 due to releasing the accelerator pedal stepped on by a driver during acceleration travelling in the series travelling mode and the required driving force becomes 0 or less, and thus, the acceleration travelling is shifted to natural deceleration travelling while the series travelling mode is maintained, the internal combustion engine ENG is controlled to hold the revolution Ne at the predetermined value NR described above without decreasing the revolution Ne to the idle revolution. However, the predetermined value NR is variable according to the vehicle speed VP and set to a greater value as the vehicle speed VP is higher. Therefore, as in the example illustrated in FIG. 8, the revolution Ne of the internal combustion engine ENG decreases as the vehicle speed VP decreases, but the revolution Ne is held at a value greater than the idle revolution. Then, when the driver depresses the accelerator pedal, the revolution Ne of the internal combustion engine ENG is increased from the predetermined value NR to a desired revolution in order for the second rotating electric machine MG2 to generate the electric power to be supplied to the first rotating electric machine MG1 according to the required driving force. In this case, the revolution Ne of the internal combustion engine ENG is not increased from the idle revolution, and thus it is possible to be reached to the desired revolution promptly and the vehicle speed VP quickly rises.

As described above, in the embodiment, when the accelerator pedal is released during acceleration travelling in the series travelling mode and the vehicle shifts to natural deceleration travelling, the control is performed to hold the revolution Ne of the internal combustion engine ENG at the predetermined value NR in preparation for the subsequent acceleration request. Since the predetermined value NR is a value variable corresponding to the vehicle speed VP, the revolution Ne of the internal combustion engine ENG when the accelerator pedal is depressed again can reach the desired revolution in a short time regardless of the vehicle speed VP at this time. In particular, since the predetermined value NR is greater as the vehicle speed VP during natural deceleration travelling is higher, the internal combustion engine ENG can reach the desired revolution within a short time from the predetermined value NR of the high revolution even when the accelerator pedal is depressed again at the high vehicle speed VP. In this way, since it is possible to shorten the response time to high output generation when the required driving force increases due to acceleration in natural deceleration travelling without depending on the vehicle speed VP, it is possible to improve acceleration responsiveness which is not dependent on the vehicle speed VP.

Further, since the predetermined value NR is lower than the revolution Ne of the internal combustion engine ENG corresponding to the vehicle speed VP in the engine travelling mode, the revolution Ne of the internal combustion engine ENG decreases when the accelerator pedal is released during acceleration travelling in the engine travelling mode and the acceleration travelling is shifted to natural deceleration travelling. Therefore, the change in the revolution Ne of the internal combustion engine ENG, which occurs when the operation of releasing the accelerator pedal during acceleration travelling in the engine travelling mode is performed, does not give a driver of the vehicle any discomfort.

Further, since the predetermined value NR is higher than the idle revolution of the internal combustion engine ENG, it is possible to improve the acceleration responsiveness when the accelerator pedal is depressed again after the accelerator pedal release operation is performed.

When the revolution Ne of the internal combustion engine ENG during the natural deceleration travelling in the series travelling mode is controlled to be held at the predetermined value NR, the second rotating electric machine MG2 is controlled to generate electricity by the power of the internal combustion engine ENG. In this case, control is performed so that the second rotating electric machine generates electricity within a range not exceeding the maximum limit value of electric power input to the energy storage device BAT and, when the electric power input to the energy storage device BAT exceeds the maximum limit value, the torque of the internal combustion engine ENG is reduced while the revolution Ne of the internal combustion engine ENG is held at the predetermined value NR. Therefore, while the energy storage device BAT is protected, it is possible to prevent the deterioration of the fuel consumption performance by storing the generated electric power and to improve the acceleration responsiveness when the accelerator pedal is depressed again.

Further, when the vehicle travels on a slope, a larger required driving force is required as the gradient of the slope is larger. However, in the embodiment, since the predetermined value NR is set to a higher value as the gradient of the uphill road on which a vehicle travels increases, even when the accelerator pedal is depressed again during the natural deceleration travelling in the series travelling mode, the acceleration responsiveness can be improved regardless of the gradient of the uphill road on which a vehicle travels.

Figure 9:
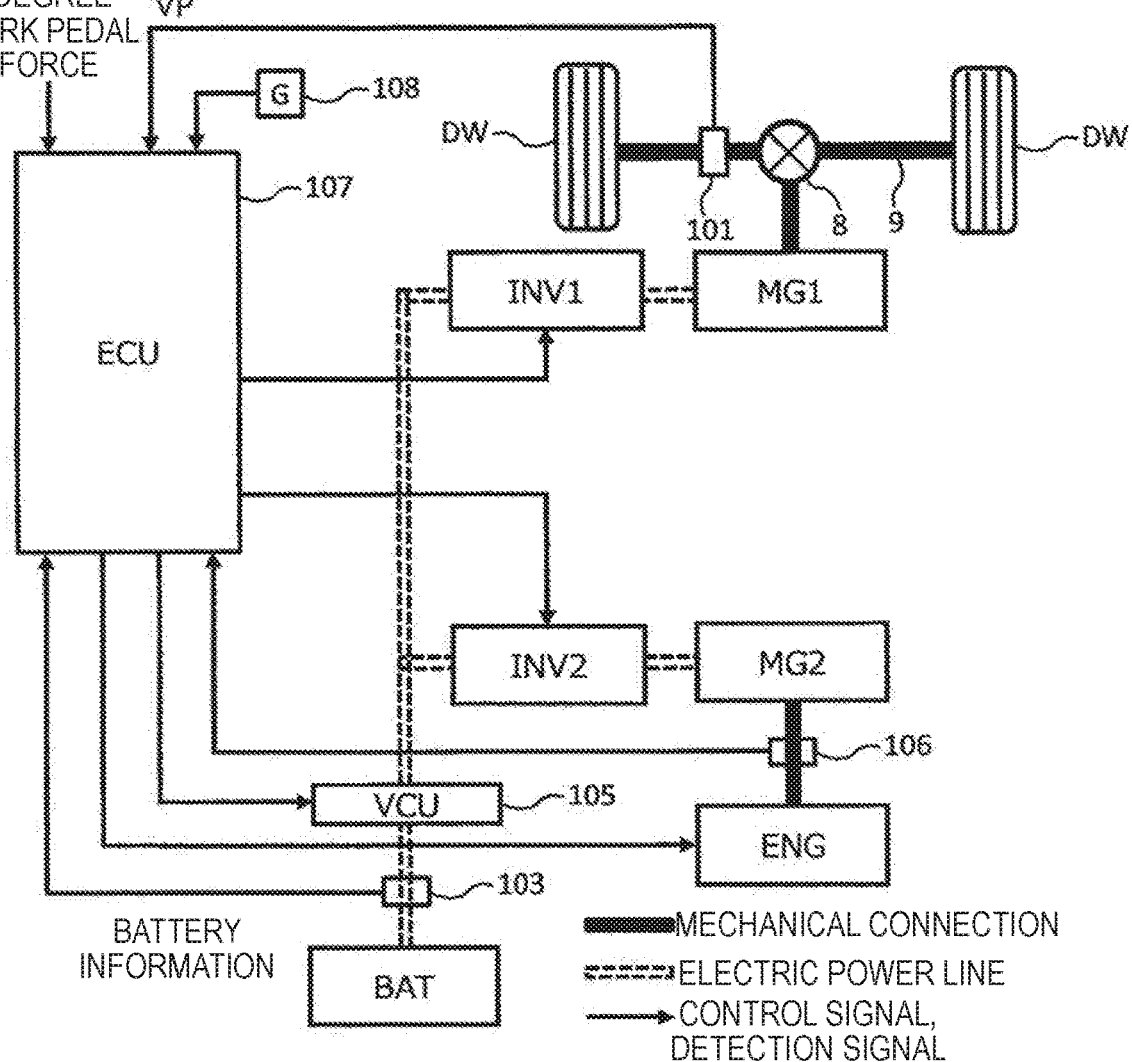
FIG. 9 is a block diagram illustrating an internal configuration of a series-type HEV.
Figure 10:
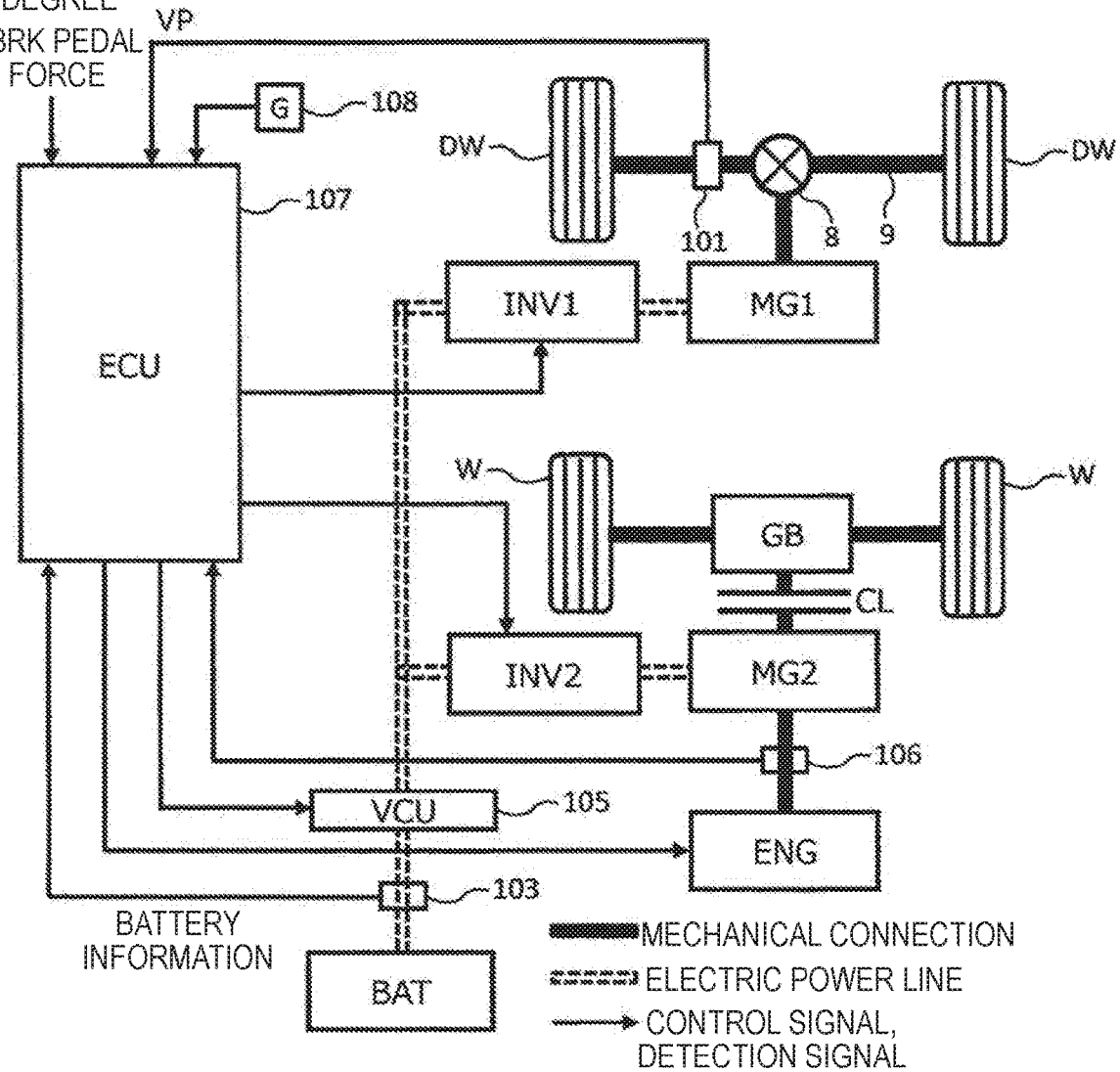
FIG. 10 is a block diagram illustrating an internal configuration of an HEV of a 2MOT-type electric 4WD.
Figure 11:
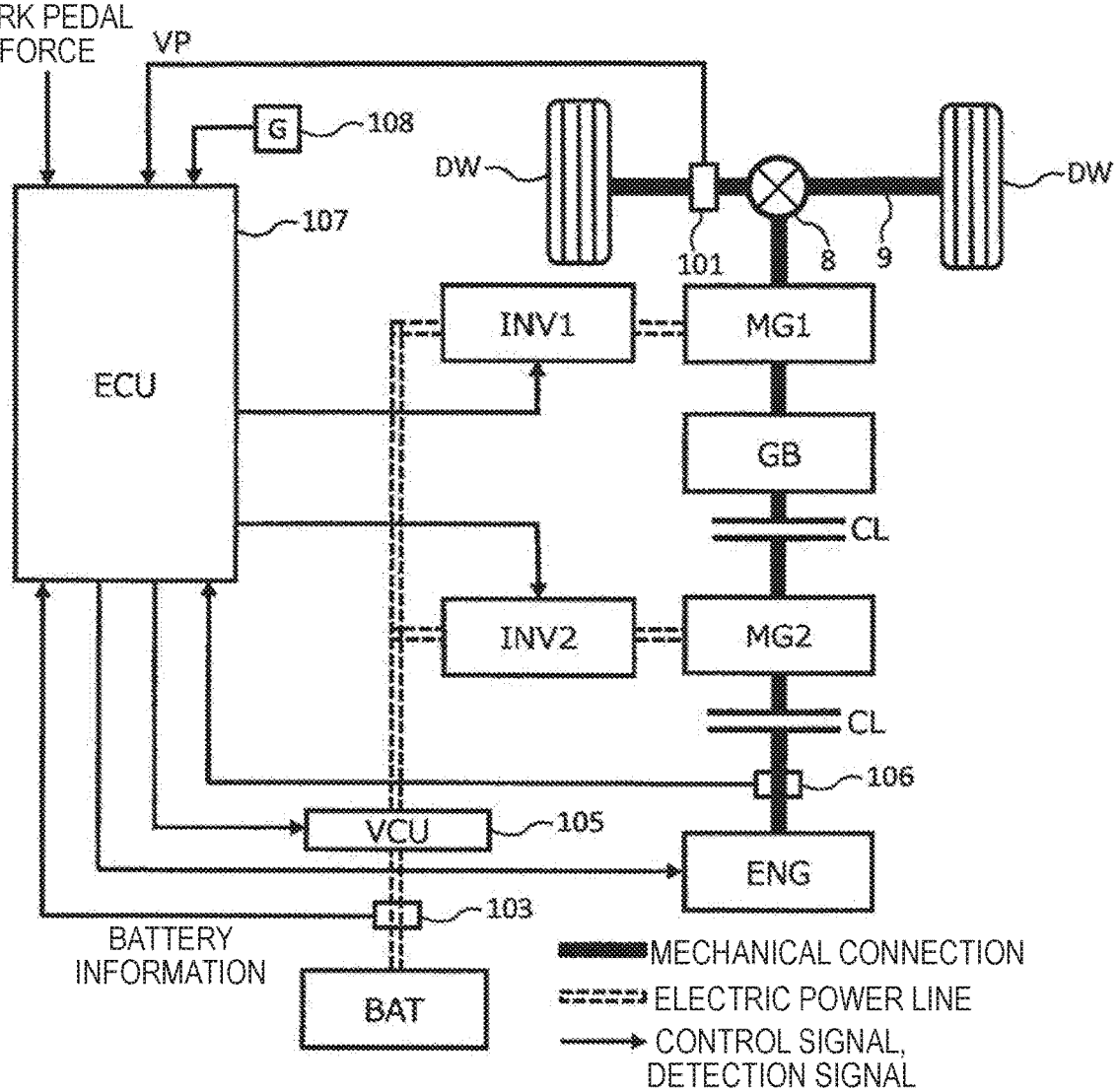
FIG. 11 is a block diagram illustrating an internal configuration of an HEV capable of switching between a series type and a parallel type in which a clutch is provided between an internal combustion engine and the second rotating electric machine.

The invention is not limited to the embodiment described above and may be appropriately modified, improved, and the like. For example, although the vehicle described above is an HEV capable of switching between a series type and a parallel type, it may be a series-type HEV illustrated in FIG. 9, an HEV of the 2MOT-type electric 4WD illustrated in FIG. 10, or an HEV capable of switching between the series type and the parallel type illustrated in FIG. 11 in which a clutch is provided between the internal combustion engine ENG and the second rotating electrical machine MG2.

The invention claimed is:

1. A hybrid vehicle comprising:
   a first rotating electric machine connected to an output shaft;
   an internal combustion engine;
   a second rotating electric machine connected to the internal combustion engine;
   a deriving portion configured to derive a required driving force based on an opening degree of an accelerator pedal operated by a driver of the hybrid vehicle; and
   a control portion configured to control the internal combustion engine, the first rotating electric machine, and the second rotating electric machine according to the required driving force,
   the control portion being configured to hold a revolution of the internal combustion engine at a predetermined value, being greater as the traveling speed is higher, and variable based on a travelling speed of the hybrid vehicle when the required driving force is 0 or less during travelling of the hybrid vehicle by power of the first rotating electric machine, and
   the control portion being configured to increase the revolution of the internal combustion engine from the held revolution to the revolution corresponding to the required driving force, when the required driving force becomes larger than 0, and when the predetermined value is lower than the revolution corresponding to the required driving force.

2. The hybrid vehicle according to claim 1, wherein
   the control portion holds the revolution of the internal combustion engine at the predetermined value when the required driving force is 0 or less during travelling of the hybrid vehicle by power of the first rotating electric machine to which electric power generated by the second rotating electric machine with power of the internal combustion engine is supplied.

3. The hybrid vehicle according to claim 1, further comprising:
a connection/disconnection portion configured to connect or disconnect a transmission path of power between the internal combustion engine and the output shaft, wherein
the predetermined value is equal to or less than the revolution of the internal combustion engine when the hybrid vehicle travels in a state where the connection/disconnection portion is engaged.

4. The hybrid vehicle according to claim 1, wherein
the predetermined value is higher than the revolution of the internal combustion engine of an idling operation.

5. The hybrid vehicle according to claim 1, wherein
when the revolution of the internal combustion engine is controlled to be held at the predetermined value, the control portion controls the second rotating electric machine to generate electric power with power of the internal combustion engine.

6. The hybrid vehicle according to claim 5, further comprising:
an energy storage device configured to be electrically connected to the first rotating electric machine and the second rotating electric machine, wherein
the control portion is configured to:
control electric power generated by the second rotating electric machine with power of the internal combustion engine to be input to the energy storage device, and
control the second rotating electric machine to generate electric power within a range not exceeding a limit value of electric power input to the energy storage device.

7. The hybrid vehicle according to claim 6, wherein
when the electric power input to the energy storage device exceeds the limit value in a state where the revolution of the internal combustion engine is controlled to be held at the predetermined value, the control portion lowers torque of the internal combustion engine while the revolution is held at the predetermined value.

8. The hybrid vehicle according to claim 1, wherein
the predetermined value, when the hybrid vehicle travels on a slope in a state where the revolution of the internal combustion engine is controlled to be the predetermined value, is a value variable corresponding to a gradient of the slope.

9. The hybrid vehicle according to claim 8, wherein
when the slope is an uphill road, the predetermined value is greater as the gradient of the uphill road is larger.

* * * * *